(12) United States Patent
Miriyala et al.

(10) Patent No.: US 10,742,557 B1
(45) Date of Patent: Aug. 11, 2020

(54) EXTENDING SCALABLE POLICY MANAGEMENT TO SUPPORTING NETWORK DEVICES

(71) Applicant: Juniper Networks, Inc., Sunnyvale, CA (US)

(72) Inventors: Prasad Miriyala, San Jose, CA (US); Manish Singh, Bengaluru (IN); Vivekananda Shenoy, Sunnyvale, CA (US); Anantharamu Suryanarayana, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/024,306

(22) Filed: Jun. 29, 2018

(51) Int. Cl.
*H04L 12/813* (2013.01)
*H04L 12/863* (2013.01)
*H04L 12/741* (2013.01)
*H04L 12/46* (2006.01)
*H04L 12/937* (2013.01)
*H04L 29/06* (2006.01)
(Continued)

(52) U.S. Cl.
CPC .......... *H04L 47/20* (2013.01); *G06F 9/45558* (2013.01); *H04L 12/4645* (2013.01); *H04L 45/74* (2013.01); *H04L 47/627* (2013.01); *H04L 49/254* (2013.01); *H04L 49/70* (2013.01); *H04L 63/0272* (2013.01); *G06F 2009/45595* (2013.01)

(58) Field of Classification Search
CPC ..... H04L 47/20; H04L 49/70; H04L 63/0272; H04L 49/254; H04L 12/4645; H04L 45/74; H04L 47/627; G06F 9/45558; G06F 2009/45595
See application file for complete search history.

(56) References Cited

U.S. PATENT DOCUMENTS

| 6,292,900 B1 | 9/2001 | Ngo et al. |
| 7,516,475 B1 | 4/2009 | Chen et al. |
(Continued)

FOREIGN PATENT DOCUMENTS

| WO | 2013184846 A1 | 12/2013 |
| WO | 2017064560 A1 | 4/2017 |

OTHER PUBLICATIONS

Droms, R. "Dynamic Host Configuration Protocol" Network Working Group, RFC 2131, Mar. 1997, 45 pp.
(Continued)

*Primary Examiner* — Dady Chery
(74) *Attorney, Agent, or Firm* — Shumaker & Sieffert, P.A.

(57) ABSTRACT

Techniques are disclosed for extending scalable policy management to supporting network devices. A network device comprising a memory and a processor may perform various aspects of the techniques. The memory may be configured to store a policy. The processor may be configured to obtain the policy to be enforced by a supporting network device coupled to a server, and identify a port of the supporting network device to which the server is coupled via the switch fabric. The policy controller may also identify a workload executed by the server to which the policy is associated, and convert the policy into configuration data supported by the network device. The policy controller may further configure, based on the configuration data, the network device to enforce the policy with respect to network traffic received via the identified port.

28 Claims, 6 Drawing Sheets

(51) Int. Cl.
  *G06F 9/455* (2018.01)
  *H04L 12/931* (2013.01)

(56) References Cited

U.S. PATENT DOCUMENTS

| | | | |
|---|---|---|---|
| 7,546,629 | B2 | 6/2009 | Albert et al. |
| 7,860,006 | B1 | 12/2010 | Kashyap et al. |
| 8,099,774 | B2 | 1/2012 | Abzarian et al. |
| 8,301,746 | B2 | 10/2012 | Head et al. |
| 9,680,875 | B2 | 6/2017 | Knjazihhin et al. |
| 2005/0180398 | A1 | 8/2005 | Deno et al. |
| 2006/0022816 | A1 | 2/2006 | Yukawa |
| 2006/0075198 | A1 | 4/2006 | Susaki et al. |
| 2007/0169186 | A1 | 7/2007 | Ueoka et al. |
| 2009/0070268 | A1 | 3/2009 | Sarkissian et al. |
| 2011/0055367 | A1 | 3/2011 | Dollar |
| 2012/0005724 | A1 | 1/2012 | Lee |
| 2013/0182722 | A1 | 7/2013 | Vishveswaraiah et al. |
| 2014/0033268 | A1 | 1/2014 | Julisch et al. |
| 2014/0245423 | A1 | 8/2014 | Lee |
| 2015/0081893 | A1* | 3/2015 | Chadwell .......... G06F 3/0659 709/224 |
| 2015/0124809 | A1* | 5/2015 | Edsall .............. H04L 47/20 370/390 |
| 2016/0055354 | A1 | 2/2016 | Jinaraj et al. |
| 2016/0261486 | A1 | 9/2016 | Fang et al. |
| 2018/0109450 | A1 | 4/2018 | Filsfils et al. |
| 2018/0316729 | A1 | 11/2018 | Chauvet et al. |
| 2019/0014124 | A1 | 1/2019 | Reddy et al. |
| 2019/0068690 | A1 | 2/2019 | Canton et al. |
| 2019/0158541 | A1 | 5/2019 | Miriyala et al. |

OTHER PUBLICATIONS

Enns et al. "Network Configuration Protocol (NETCONF)" Internet Engineering Task Force (IETF), RFC 6241, Jun. 2011, 113 pp.
Mockapetris, P. "Domain Names—Concepts and Facilities" Network Working Group, RFC 1034, Nov. 1987, 55 pp.
Mockapetris, P. "Domain Names—Implementation and Specification" Network Working Group, RFC 1035, Nov. 1987, 55 pp.
Sajassi et al. "BGP MPLS-Based Ethernet VPN" Internet Engineering Task Force (IETF), RFC 7432, Feb. 2015, 56 pp.
Sangli et al. "BGP Extended Communities Attribute" Network Working Group, RFC 4360, Feb. 2006, 12 pp.
U.S. Appl. No. 15/819,522, Juniper Networks, Inc. (inventor: Miriyala et al.), entitled "Scalable Policy Management for Virtual Networks," filed Nov. 21, 2017.
U.S. Appl. No. 15/476,136, Juniper Networks, Inc. (inventor: Mehta et al.), entitled "Session-Based Traffic Statistics Logging for Virtual Routers", filed Mar. 31, 2017.
Nutanix, Apr. 9, 2019, available at https://www.nutanix.com/blog/building-things-people-like (last accessed Aug. 22, 2019), 4 pp.
"3.2 Rules Headers," SNORTUsers Manual 2.911, Applicant points out, in accordance with MPEP 609.04(a), that the year of publication, 2008, is sufficiently earlier than the effective U.S. filing date, 2017, so that the particular month of publication is not an issue, accessed from http://manual-snort-org.s3-website-us-east-1.amazonaws.com/node29.html#SECTION00421000000000000000, 4 pp.
"ClearSky Takes Primary Storage 'To the Cloud'" A DeepStorage Technology Validation Report, DeepStorage, LLC Aug. 31, 2015, 15 pp.
"Container Orchestration Services" Mesosphere, Mar. 24, 2016, available at www.mesosphere.com > solutions > container-orchestration (last accessed Aug. 22, 2019), 7 pp.
"Federation" The Kubernetes Authors, Mar. 12, 2019, available at https://kubernetes.io/docs/tasks/federation/ (last accessed Aug. 22, 2019) 7 pp.
"Firewall as a Service API 2.0," OpenStack Neutron Team, OpenStack Cloud Software, last updated Sep. 21, 2017, accessed from https://specs.openstack.org/openstack/neutron-specs/specs/newton/fwaas-api-2.0.html, 31 pp.
"Hyper-Converged Kubernetes Architecture: ROBIN—Databases, Big Data" ROBIN, May 28, 2019, available at https://robin.io/product/architecture/ (last accessed Aug. 22, 2019), 4 pp.
"Hyperconverged Kubernetes" White Paper, ROBIN, Jan. 28, 2019, available at https://robin.io/portfolio/hyperconverged-kubernetes-whitepaped (last accessed Aug. 22, 2019), 15 pp.
"Juniper / Contrail-specs / fw_security_enhancements.md," GitHub, May 20, 2017, accessed from https://github.com/Juniper/contrail-specs/blob/master/fw_security_enhancements.md, 10 pp.
"Marathon Placement Constraints" Mesosphere DC/OS Documentation, Mesosphere, Oct. 25, 2018, available at https://docs.d2iq.com/mesosphere/dcos/1.12/deploying-services/marathon-constraints/ (last accessed Aug. 22, 2019), 2 pp.
"Multi-Cloud" NooBaa, Apr. 28, 2018, available at https://www.noobaa.io/multicloud (last accessed Aug. 22, 2019), 7 pp.
"Open-Source, Cloud-Native Storage for Kubernetes" Rook Authors, Jun. 27, 2017, available at https://rook.io (last accessed Aug. 22, 2019), 6 pp.
"Openly serious about storage" REX-Ray, Feb. 28, 2018, available at https://rexray.readthedocs.io/en/stable/ (last accessed Aug. 22, 2019), 5 pp.
"OpenStack Docs: Placement Usage" The OpenStack Project, Mar. 18, 2019, available at https://docs.openstack.org/placement/latest/usage/index.html (last accessed Aug. 22, 2019), 3 pp.
"OpenStack Docs: Stein Series Release Notes" The OpenStack Project, Apr. 11, 2019, available at https://docs.openstack.org/releasenotes/placement/stein.html# (last accessed Aug. 22, 2019), 4 pp.
"OpenStack Stein—OpenStack is open source software for creating private and public clouds." The OpenStack Project, Apr. 10, 2019, available at https://www.openstack.org/software/stein/ (last accessed Aug. 22, 2019), 34 pp.
"Portworx features & pricing: Container storage, HA, security" The Portworx Platform, Dec. 5, 2018, available at https://portworx.com/products/features/ (last accessed Aug. 22, 2019), 8 pp.
"REX-Ray" REX-Ray, Apr. 23, 2018, available at https://rexray.io (last accessed Aug. 22, 2019), 12 pp.
"Run Kubernetes Everywhere" Container Orchestration, Kubernetes Management, Rancher.com (last accessed Aug. 22, 2019), May 1, 2019, 10 pp.
"Scality RING Multi-Cloud Data Storage at Petabyte Scale" Scality Ring 7.4 Data Sheet, Scality, Jun. 5, 2018, 4 pp.
"Service group and Service Object support," OpenStack Neutron Team, OpenStack Cloud Software, last updated Mar. 17, 2015, accessed from http://specs.openstack.org/openstack/neutron-specs/specs/kilo/service-group.html, 7 pp.
"What is Multi Cloud?" Scality, Dec. 2, 2017, available at https://www.scality.com/topics/what-is-multi-cloud/ (last accessed Aug. 22, 2019), 10 pp.
Callahan, "Introducing the Zenko Multi-Cloud Data Controller—Scality" Scality, Jul. 12, 2017, available at https://www.scality.com/introducing-zenko-multi-cloud-data-controller/ (last accessed Aug. 22, 2019), 10 pp.
Hölzle et al. "Introducing Anthos: an entirely new platform for managing applications in today's multi-cloud world" Google, Inc., Apr. 9, 2019, available at https://cloud.google.com/blog/topics/hybrid-cloud/new-platform-for-managing-applications-in-todays-multi-cloud-world, (last accessed Aug. 22, 2019), 2 pp.
Meyer, "Red Hat Squeezes OpenStack, OpenShift Closer Together" SDxCentral, Nov. 13, 2018, available at https://www.sdxcentral.com/articles/news/red-hat-squeezes-openstack-openshift-closer-together/2018/11/ (last accessed Aug. 22, 2019), 3 pp.
Rehman et al. "Kubernetes Federation Evolution" The Kubernetes Authors, Dec. 12, 2018, available at https://kubernetes.io/blog/2018/12/12/kubernetes-federation-evolution/ (last accessed Aug. 22, 2019), 8 pp.
U.S. Appl. No. 16/118,107, filed Aug. 30, 2018 entitled "Multiple Virtual Network Interface Support for Virtual Execution Elements", Juniper Networks, Inc. (inventor:Rao et al.).
U.S. Appl. No. 16/355,289, filed Mar. 15, 2019 entitled "Storage Volume Replication Across Multiple Data Centers", Juniper Networks, Inc. (inventor: Echegaray et al.).

(56) References Cited

OTHER PUBLICATIONS

Office Action dated Aug. 27, 2019 in U.S. Appl. No. 15/819,522, 10 pp.
Response filed Nov. 27, 2019 to the Office Action dated Aug. 27, 2019 in U.S. Appl. No. 15/819,522, 26 pp.
Notice of Allowance from U.S. Appl. No. 16/023,978, dated Mar. 5, 2020, 20 pp.
Notice of Allowance from U.S. Appl. No. 15/819,522, dated Jan. 3, 2020, 8 pp.
Notice of Allowance from U.S. Appl. No. 15/819,522, dated May 11, 2020, 8 pp.
Notice of Allowance from U.S. Appl. No. 16/023,978, dated May 14, 2020, 8 pp.

* cited by examiner

EXTENDING SCALABLE POLICY MANAGEMENT TO SUPPORTING NETWORK DEVICES

TECHNICAL FIELD

This disclosure generally relates to computer networks, and more specifically, to policy management for computer networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

SUMMARY

In general, the disclosure describes techniques for extending scalable policy management using supporting network devices that enforce policies in support of servers that originate or receive network traffic switched by the supporting network devices. An example server includes a so-called bare metal server (BMS) in which data center operators may restrict execution, by the BMS, of third party services, such as agents that may otherwise enforce the policies. The techniques may enable a top-of-rack (TOR) switch, chassis switch, or other supporting network device to act as a policy enforcement device that enforces, on behalf of the BMS, the policies.

Although described primarily in this disclosure with respect to BMSes, the techniques may enable other extensions of scalable policy management using supporting network devices. For example, the techniques may allow a supporting network device to enforce security policies for a server providing less security services than the security services provided by the supporting network device. Furthermore, extending scalable policy management to supporting network devices may allow for offloading of computing workloads associated with policy enforcement to the supporting network devices to preserve compute resources of the servers for actual tenant/customer processes.

In one example, various aspects of the techniques are directed to a method comprising: obtaining, by a policy controller, a policy to be enforced by a supporting network device of a switch fabric coupled to a server; identifying, by the policy controller, a port of the supporting network device to which the server is coupled via the switch fabric; identifying, by the policy controller, a workload executed by the server to which the policy is associated; converting, by the policy controller, the policy into configuration data supported by the network device, the configuration data indicating that a portion of the policy is to be enforced at the identified port; and configuring, by the policy controller and based on the configuration data supported by the network device, the network device to enforce the portion of the policy with respect to network traffic passing between the network device and the workload executed by the server via the identified port.

In another example, various aspects of the techniques are directed to a network device comprising: a memory configured to store a policy; and one or more processors configured to execute a policy controller to: obtain the policy to be enforced by a supporting network device of a switch fabric coupled to a server; identify a port of the supporting network device to which the server is coupled via the switch fabric; identify a workload executed by the server to which the policy is associated; convert the policy into configuration data supported by the network device, the configuration data indicating that a portion of the policy is to be enforced at the identified port; and configure, based on the configuration data, the network device to enforce the portion of the policy with respect to network traffic passing between the network device and the workload executed by the server via the identified port.

In another example, various aspects of the techniques are directed to a non-transitory computer-readable storage medium having stored thereon instructions that, when executed, cause one or more processors of a policy controller to: obtain a policy to be enforced by a supporting network device of a switch fabric coupled to a server; identify a port of the supporting network device to which the server is coupled via the switch fabric; identify a workload executed by the server to which the policy is associated; convert the policy into configuration data supported by the network device, the configuration data indicating that a portion of the policy is to be enforced at the identified port; and configure, based on the configuration data, the network device to enforce the portion of the policy with respect to network traffic passing between the network device and the workload executed by the server via the identified port.

In another example, various aspects of the techniques are directed to a data center comprising: a server directly coupled to a network device; a controlling device comprising: a memory configured to store a policy; and one or more processors configured to execute a policy controller that: obtains, by a policy controller and from the memory, the policy to be enforced by the network device; converts, by the policy controller, the policy into configuration data supported by the network device; and configures, by the policy controller and based on the configuration data, the network device to enforce the policy; the network device comprising: a memory configured to store the configuration data; and one or more processors configured to: receive one or more of network traffic directed to the server and network traffic received from the server; and enforce at least some aspect of the policy with respect to one or more of network traffic directed to the server and network traffic sent from the server.

The details of one or more examples of the techniques of this disclosure are set forth in the accompanying drawings and the description below. Other features, objects, and advantages of the techniques will be apparent from the description and drawings.

BRIEF DESCRIPTION OF DRAWINGS

Like reference characters refer to like elements throughout the figures and description.

DETAILED DESCRIPTION

Figure 1:
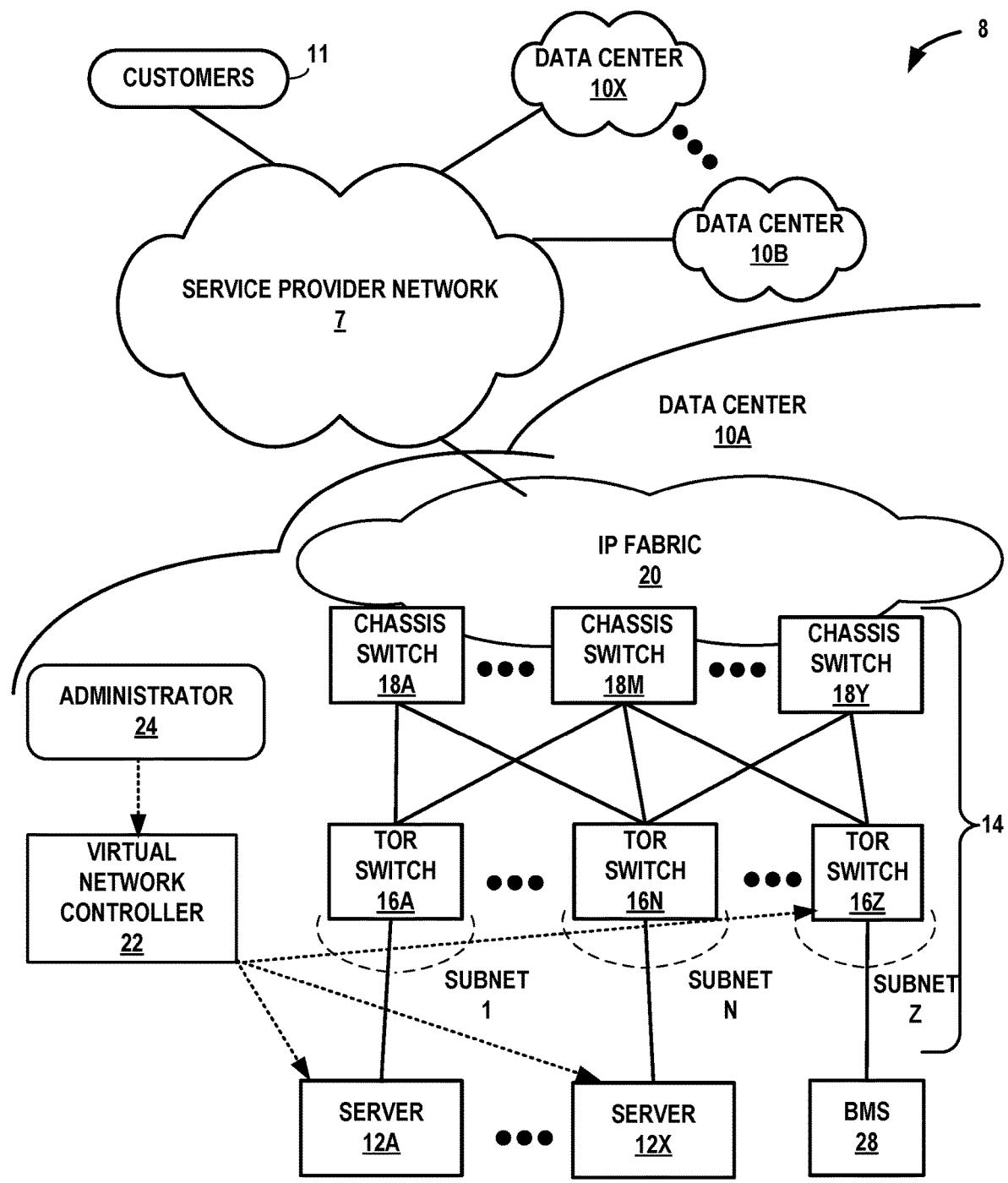
FIG. 1 is a block diagram illustrating an example network having a data center in which examples of the techniques described herein may be implemented.

FIG. 1 is a block diagram illustrating an example network system in which examples of the techniques described herein may be implemented. Network system 2 in the example of FIG. 1 includes data centers 10A-10X (collectively, "data centers 10") interconnected with one another and with customer networks associated with customers 11 via a service provider network 7. In general, each data center 10 provides an operating environment for applications and services for customers 11 coupled to the data center by service provider network 7. Data centers 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, each data center 10 may represent one of many geographically distributed network data centers. As illustrated in the example of FIG. 1, each of data centers 10 may represent a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or supercomputing, and so on. In some embodiments, each of data centers 10 may be individual network servers, network peers, or otherwise.

In this example, each of data centers 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16Z (collectively, "TOR switches 16") coupled to a distribution layer of chassis switches 18A-18M (collectively, "chassis switches 18"). Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 by service provider network 7.

Virtual network controller 22 ("VNC") provides a logically and in some cases physically centralized controller for facilitating operation of one or more virtual networks within each of data centers 10, such as data center 10A, in accordance with one or more embodiments of this disclosure. In some examples, virtual network controller 22 may operate in response to configuration input received from network administrator 24. Additional information regarding virtual network controller 22 operating in conjunction with other devices of data center 10A or other software-defined network is found in International Application Number PCT/US2013/044378, filed Jun. 5, 2013, and entitled "PHYSICAL PATH DETERMINATION FOR VIRTUAL NETWORK PACKET FLOWS," which is incorporated by reference as if fully set forth herein.

In some examples, the traffic between any two network devices, such as between network devices within IP fabric 20 (not shown), between servers 12 and customers 11, or between servers 12, for example, can traverse the physical network using many different paths. A packet flow (or "flow") can be defined by the five values used in a header of a packet, or "five-tuple," i.e., the protocol, source IP address, destination IP address, source port and destination port that are used to route packets through the physical network. For example, the protocol specifies the communications protocol, such as TCP or UDP, and source port and destination port refer to source and destination ports of the connection.

A set of one or more packet data units (PDUs) that include a packet header specifying a particular five-tuple represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

In some examples, each of data centers 10 may implement different policies within different computing environments according to the needs of the particular environment. For example, a development environment, a staging environment, and a production environment of data center 10A may each have different requirements for various policies for the network, such as firewall, network, application, and/or global policies.

Furthermore, multiple data centers 10 across different geographic locations may implement different policies within each of their respective internal computing environments due to different customer requirements, networking resources and configurations, etc. If each computing environment within each of data centers 10 were to independently manage its own policies, an administrator may have difficulty ensuring that each policy meets security, reliability, and quality requirements. Furthermore, if each computing environment within each data center were to independently manage its own policies, upgrading one or more of the policies across the multiple data centers may become cumbersome or unmanageable.

As such, network system 8 may implement a scalable, multi-dimensional policy framework to support flexible application of policies for controlling network traffic among workloads executing within one or more computing environments for data centers 10 that may be categorized along multiple different dimensions. Such categories may include applications, deployments, application tiers, geographic sites, virtual networks, virtual machines, interfaces, projects, security requirements, quality requirements, physical devices, such as routers or switches, users, and/or compliance requirements, to provide a few examples. Each type of category represents a dimension for workloads that generate or process network traffic of data centers 10. In some examples, the policy framework described herein permits administrator 24 to tag objects that execute or otherwise process workloads with specific dimensions across multiple levels.

In various examples, policy controller 23 distributes policy rules including tags for objects at a project level. However, policy controller 23 may additionally or alternatively distributing policy rules including tags specifying various different object levels, such as a global environment level, a project level, a virtual network level, a virtual machine level, or an interface level.

Policy controller 23 may use a plurality of configuration objects to implement the one or more policies. As one example, policy controller 23 may apply a first set of configuration objects at a global level. The first set configuration objects includes global application policy sets, global firewall policies, global firewall rules, and global tags across a plurality of levels and/or categories. Policy controller 23 distributes, for example to the virtual routers, the first set of configuration objects at the global level. Policy controller 23 matches global tags associated with global application policy sets, global firewall policies, and global firewall rules to objects tagged with the global tags. Based on the global application policy sets, global firewall policies, and global firewall rules, policy controller 23 allows or blocks network traffic between interfaces of the objects tagged with the global tags. The interfaces may be virtual machine interfaces (VMIs), for instance, or switch interfaces of switches 16, 18.

Policy controller 23 may apply a second set of configuration objects at a project level. The second set of policy rules may include project-specific application policy sets, firewall policies, firewall rules, and tags across a plurality of levels. Policy controller 23 distributes the second set of configuration objects at the project level. Policy controller 23 matches project tags associated with project-specific application policy sets, firewall policies, and firewall rules to objects tagged with the project tags. Based on the project-specific application policy sets, firewall policies, and firewall rules, policy controller 23 allows or blocks network traffic between interfaces of the objects tagged with the project tags.

In further examples, policy controller 23 may specify lower-level configuration objects, such as application policy sets, firewall policies, firewall rules, and tags defined at a virtual network-specific level, a virtual machine-specific level, and/or an interface-specific level. By doing so, policy controller 23 may apply a hierarchical set of policies to a plurality of objects within one or more data centers 10. Thus, the techniques of the disclosure allow for distribution of simplified traffic policies that are scalable and robust across many different types of deployments and execution environments. Additional description is found in U.S. patent application Ser. No. 15/819,522, filed Nov. 22, 2017 and entitled "Scalable Policy Management for Virtual Networks," which is incorporated by reference in its entirety.

As described herein, a "tag" refers to a data structure that provides information to categorize an object according to a particular value or set of values. A tag may include a tag identifier (ID). In one example, tags map security requirements for the corresponding objects. Tags may be predefined (e.g., such as a tag for an application, deployment, application tier, or geographic site), or may be implicitly assigned during provisioning (e.g., such as a tag describing infrastructure, a rack, a cluster, or a data center which is provisioned to support the application). In some examples, multiple tags are applied to a single object (e.g., an "application" and "geographic site" tag may be applied to a single virtual machine), but the object may only have a single tag per type and/or category. In further examples, a user may define "labels" to be used as keys for the key/value pairs of tags such that the user may customize or create his or her own categories for tagging objects. Furthermore, as used herein, "tagging" an object refers to categorizing the object in a category specified by a tag included in a policy rule.

Policies may then be expressed along multiple dimensions in terms of tags corresponding to categories to which the tagged objects correspond. Distributed VN agents executing on computing devices that host the workloads, e.g., one or more of servers 12, may then apply the policies to tagged objects that are members of categories to allow or deny a traffic flow between the objects tagged with one or more categories for one or more dimensions. At least in some cases, the VN agents apply the policies at the interface level of one or more virtual machines to permit or block network traffic flowing to and/or from interfaces of the one or more virtual machines.

In some examples, an extension of a Border Gateway Protocol (BGP) is provided for communicating the policy framework between categories. For example, a VN agent may receive, from a policy controller executed as one example by virtual network controller 22, a BGP message that includes an extended community specifying one or more policy rules, each policy rule including one or more tags that include tag identifiers (which are converted from the key/value pairs) corresponding to categories that include the tagged objects. Further, each policy rule of the one or more policy rules may specify whether to permit or block network traffic between objects tagged by the one or more tags. Additional information with respect to the implementation of BGP extended communities is described in "BGP Extended Communities Attribute," RFC 4360, Internet Engineering Task Force (IETF), February 2006, available at https://tools.ietf.org/rfc/rfc4360, the entire contents of which is incorporated herein by reference.

In this respect, scalable deployment of policies across different environments may be achieved within a plurality of data centers 10 in a manner that potentially reduces the complexity and simplifies management of such policies within the plurality of data centers 10. More information concerning policy distribution can be found in above noted U.S. patent application Ser. No. 15/819,522, entitled "SCALABLE POLICY MANAGEMENT FOR VIRTUAL NETWORKS," filed Nov. 21, 2017.

However, the scalable policy deployment may not accommodate all of the various environments present in data centers and other networks. As further shown in the example of FIG. 1, switch fabric 14 may include additional TOR switches 160-16Z that interface with so-called bare metal servers ("BMS") 28. BMS 28 may represent a server dedicated for use by a single customer, which may also be called a "single-tenant server." Unlike servers 12 in which multiple customers (or, again, in other words, "tenants") may interact with the same physical hardware, i.e., server 12, to interface with their individually allocated virtual router, BMS 28 is dedicated for use only by a single customer.

BMS 28 may provide dedicated hardware for use by the single customer to avoid so-called "noisy neighbor problems" that occur in multi-tenant servers 12. That is, while each customer may receive a dedicated virtual router that generally is not impacted by operation of any other dedicated virtual routers by one of multi-tenant servers 12, in certain contexts, the other virtual routers may consume resources (e.g., processor cycles, memory, bandwidth, etc.) that would have otherwise been available for another customer's virtual routers, thereby degrading the performance of the remaining virtual routers (much as a noisy neighbor may create problems for other residents, hence the name "noisy neighbor problems"). As such, BMS 28 may provide a dedicate hardware environment that avoids such noisy neighbor problems, and thereby potentially ensures that the customer processing demands are more likely to be met. One premise driving the use of BMS 28 therefore lies in exclusivity, and as a result, some data center operators may not allow BMS 28 to execute the above noted VN agents responsible for enforcing the policies within BMS 28.

Furthermore, certain devices may not support all of the features enabled by the scalable policy deployment discussed above. As an example, some network devices may only support basic firewall functions, and not full featured firewall functions enabled through use of the scalable policy deployment discussed above, thereby detracting from the usefulness of the policy deployment.

In accordance with the techniques described in this disclosure, the scalable policy deployment is extended to allow supporting network devices, such as TOR switch 160-16Z, to enforce policies on behalf of devices, such as BMS 28. Rather than install the VN agent on BMS 28 itself, the virtual network controller 22 may effectively deploy policies to TOR switches 16, such as TOR switch 16Z, that the TOR switch 16Z may enforce in support of BMS 28 in various instances. Virtual network controller 22 may create an object for TOR switch 16Z and/or BMS 28 (e.g., a single object that represents both TOR switch 16Z and BMS 28 or distinct objects that represent each of TOR switch 16Z and BMS 28), and associate various tags and other data to the object resulting in a policy. Virtual network controller 22 may next deploy the policy to TOR switch 16Z. The TOR switch 16Z may then enforce the policy in support of BMS 28 to permit or block network traffic based on policy rules set forth in the policies.

Virtual network controller 22 may also execute a TOR service node (TSN) in support of BMS 28 in order to provide domain name service (DNS) and dynamic host configuration profile (DHCP) functionality. The TSN may further be extended to advertise various routes using the above noted BGP routing protocol or some other routing protocol.

The TSN may identify, in a BGP route advertisement, routes, such as a type-2 Ethernet virtual private network (EVPN) route (which includes a media access control—MAC—address and Internet protocol—IP—address). The TSN may also identify, in the BGP route advertisement, one or more of the following for each of the routes: a nexthop (selecting TOR switch 16Z as the nexthop for each of the routes), a label (such as a label associated with a virtual local area network—VLAN—or a virtual extensible local area network—VXLAN), any tags associated with the route, security groups to which the route corresponds, and any other attributes that are capable of being sent with a route.

The TSN may advertise the routes via the BGP route advertisement to inform VN agents 35 of the routes, and any tags associated with the routes forming policies that are to be enforced. Although described as the transmitting the BGP route advertisement, the TSN may not, in some instances, generate and transmit the BGP route advertisement. In some instances, TOR switch 16Z may generate and transmit the BGP route advertisement on behalf of BMS 28. TOR switch 16Z may implement BGP in certain contexts, which may be configured to generate and transmit the BGP route advertisement that includes the tags and route in the manner described above.

In this respect, various aspects of the techniques may enable TOR switch 16Z (or any other supporting network device) to operate on behalf of BMS 28 to allow for scalable policy deployment to accommodate previously inaccessible BMS 28. The device supporting policy distribution and enforcement for other adjacent devices may be referred to as a supporting network device. In the example of FIG. 1, TOR switch 16Z represents one example of a supporting network device. The device receiving the support may be located adjacent to, if not directly adjacent to—referring to a direct connection between the supporting device and the device receiving the support, as an adjacent network device. BMS 28 represents one example of an adjacent network device. Although described primarily with respect to TOR switch 16Z, similar policy enforcement-related operations may be performed by any of TOR switches 16, chassis switches 18, or other network devices that make up switch fabric 14.

In operation, virtual network controller 22 may obtain a policy to be enforced by TOR switch 16Z coupled to BMS 28. Virtual network controller 22 may obtain the policy from a database or other memory and/or storage device. Administrator 24 may specify the policy or otherwise generate the policy.

Virtual network controller 22 may next convert the policy into configuration data supported by TOR switch 16Z. As described above, the policy may include an intent-based policy that, for firewall or other security services, may identify flows that are to be blocked from reaching BMS 28 and/or transmitted from BMS 28. The intent-based policy may also identify flows that are permitted to reach BMS 28 and/or transmitted from BMS 28. Virtual network controller 22 may convert the intent-based policies into configuration data representative of access control lists (ACLs) that are supported by TOR switch 16Z. The access control list may include one or more entries that each identifies a flow, and an action to be performed with respect to the identified flow (such as "drop" or "forward").

Virtual network controller 22 may then configure, based on the configuration data, TOR switch 16Z effectively enforce the policy with respect to one or more of network traffic directed to BMS 28 or network traffic received from BMS 28. That is, TOR switch 16Z, once configured according to the configuration data, may apply the ACLs to any flows received by the TOR switch 16Z in order to enforce the policy in support of BMS 28.

In this respect, the techniques may extend scalable policy management using supporting network devices, e.g., TOR switch 16Z, that enforce policies in support of adjacent network devices, such as BMS 28. The techniques may further allow for supporting network devices to operate on behalf of devices that provide less features, such as the adjacent network device that only provides a basic firewall service. The supporting network device may execute the VN agent to allow the scalable policy deployment discussed in the above noted U.S. patent application to be extended to less feature rich devices, such as the above noted adjacent network device that is only capable of providing the basic firewall service. In this respect, the techniques may allow for improved network security. However, the techniques may be leveraged to allow the supporting device to provide any other features on behalf of another device.

The techniques may also allow for balancing of resource utilization across the supporting network device and the adjacent network device on behalf of which the supporting network device operates. That is, in certain circumstances, it may be inefficient to execute the VN agent and the routing protocol used to advertise the routes on the actual device itself, such as BMS 28 in the example of FIG. 1. The techniques may offload operations of the VN agent (referring in this example to policy enforcement) to the TOR switch 16Z and the routing advertisement to virtual network controller 22 so as to better balance workloads across TOR switch 16Z and/or virtual network controller 22 and BMS 28, thereby potentially improving the performance of the devices themselves (as resource utilization is better balanced resulting in improved processing throughput and less individual memory and bus bandwidth utilization that may result in less power consumption).

Supporting network devices may, in certain contexts, be restricted to devices that are directly adjacent (meaning that such supporting devices directly connect to the adjacent device without there being any intervening routing or switching devices) to the device receiving the support, as TOR switch 16Z may, to effectively enforce the policy, be required to receive all traffic destined for and sent by BMS 28. In providing support for other policies, the adjacent network device need not be directly adjacent, such as in instances where various aspects of the techniques allow for load balancing.

Figure 2:
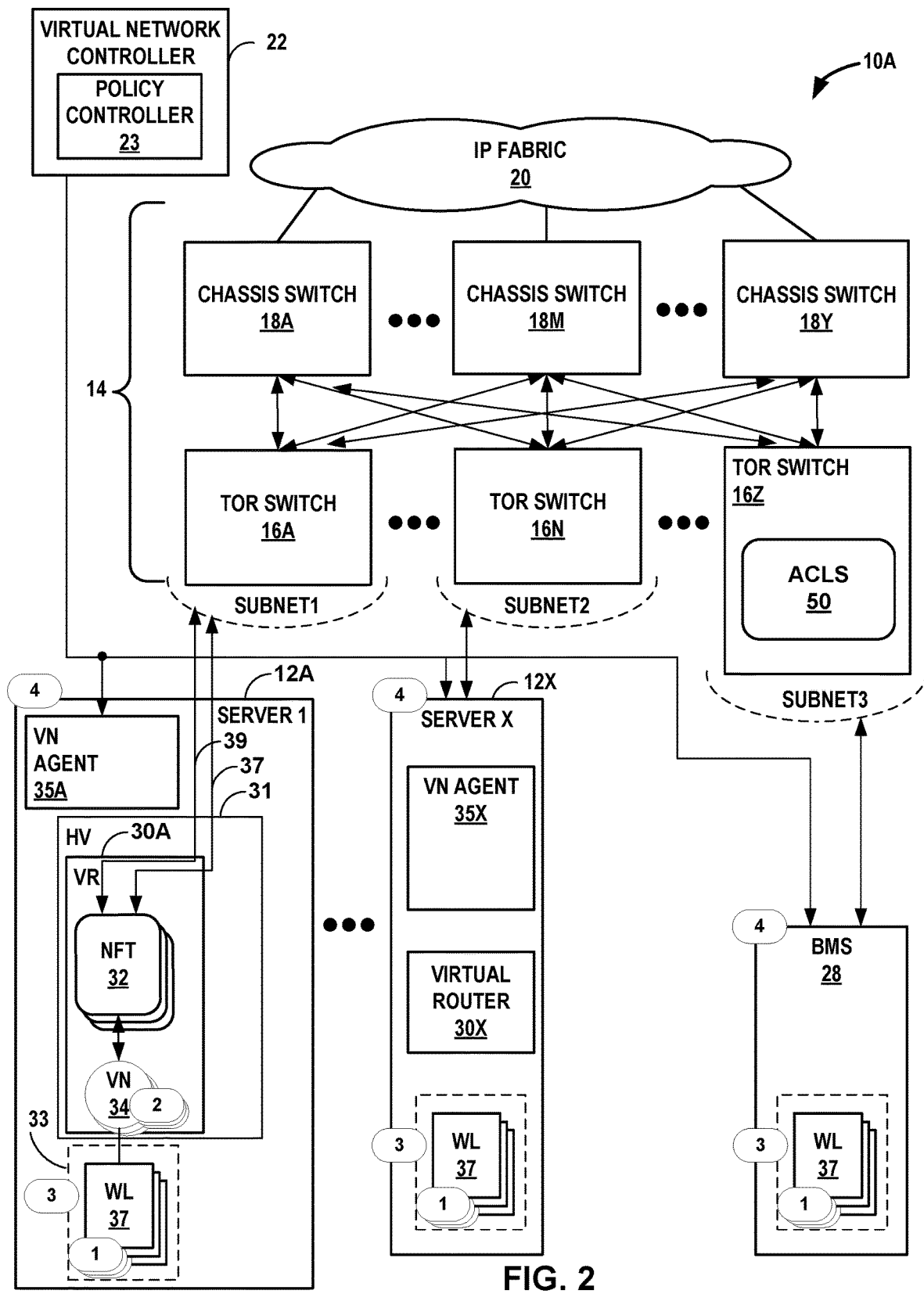
FIG. 2 is a block diagram illustrating an example implementation of the data center of FIG. 1 in further detail.

FIG. 2 is a block diagram illustrating an example implementation of data center 10A of FIG. 1 in further detail. In the example of FIG. 2, data center 10A includes an overlay network that extends switch fabric 14 from physical switches 16, 18 to software or "virtual" switches 30A-30X (collectively, "virtual routers 30" or "VR 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various processes may be used to transport packets within and across virtual networks 34 over the physical network. In some examples, virtual networks 34 may provide multicast service without requiring multicast support in the underlying physical network.

Each virtual router 30 may execute within a hypervisor, a host operating system or other component of each of servers 12. Each of servers 12 may represent an x86 or other general-purpose server, or a special-purpose server, capable of executing workloads (WL) 37. In the example of FIG. 2, virtual router 30A executes within hypervisor 31, also often referred to as a virtual machine manager (VMM) and may be denoted as "HV" in the example of FIG. 2, which provides a virtualization platform that allows multiple operating systems to concurrently execute within one of servers 12. In the example of FIG. 2, virtual router 30A manages virtual networks (VN) 34, each of which provides a network environment for execution of one or more virtual machines (VMs) (that may execute one or more of WLs 37) within the virtualization platform provided by hypervisor 31. Each VM is associated with one of the virtual networks and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of the VMs may represent containers, another form of virtualized execution environment. That is, both virtual machines and container are examples of virtualized execution environments for executing workloads.

In general, each WL 37 may be any type of software application and may be assigned a virtual address for use within a corresponding virtual network 34, where each of the virtual networks may be a different virtual subnet provided by virtual router 30A. A WL 37 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls the overlay of virtual networks 34 and that coordinates the routing of data packets within server 12. In general, each VN agent 35 communicates with virtual network controller 22, which generates commands to control routing of packets through data center 10A. VN agents 35 may operate as a proxy for control plane messages between WLs 37 and virtual network controller 22. For example, a WL 37 may request to send a message using its virtual address via the VN agent 35A, and VN agent 35A may in turn send the message and request that a response to the message be received for the virtual address of one of WLs 27 that originated the first message. In some cases, a WL 37 may invoke a procedure or function call presented by an application programming interface of VN agent 35A, and the VN agent 35A may handle encapsulation of the message, including addressing. Each VN agent 35 may also apply one or more policies to one or more categories, as described in more detail below.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more overlay networks. Besides IPinIP, other example tunneling protocols that may be used include IP over GRE, VxLAN, MPLS over GRE, MPLS over UDP, etc.

As noted above, virtual network controller 22 provides a logically centralized controller for facilitating operation of one or more virtual networks within data center 10A. Virtual network controller 22 may, for example, maintain a routing information base, e.g., one or more routing tables that store routing information for the physical network as well as one or more overlay networks of data center 10A. Switches 16, 18 and virtual routers 30 may also maintain routing information, such as one or more routing and/or forwarding tables. In one example, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

As further shown in the example of FIG. 2, virtual network controller 22 includes a policy controller 23. Policy controller 23 may represent a unit configured to tag a plurality of objects across a plurality of levels. In some examples, the plurality of levels include a level of an object, such as a global environment level, a project level, a virtual network level, a virtual machine level, or an interface level of the object. Policy controller 23 may also, in some instances, tag the plurality of objects across a plurality of categories. In some examples, the plurality of categories include applications executing within VMs 36, deployments, application tiers, geographic sites, virtual networks, WLs 37, interfaces, projects, security requirements, quality requirements, users, or compliance requirements.

In some examples, policy controller 23 further distributes, to respective VN agents 35, a plurality of policies. Each policy of the plurality of policies includes one or more policy rules for controlling network traffic. Each policy rule of the plurality of policy rules specifies one or more tags, each tag further specifying one or more dimensions of the categories.

Upon receiving the plurality of policies, each VN agent 35 applies the one or more policy rules of each of the plurality of policies to tagged objects corresponding to tags of the one or more policy rules to control network traffic between the tagged objects. For example, VN agents 35 under the direction of policy controller 23 express the one or more policy rules at logical interfaces of WLs 37 that are tagged with tags corresponding to tags of the one or more policy rules. VN agents 35 permit or block network traffic to and/or from the logical interfaces based on the one or more policy rules.

In some examples, policy controller 23 distributes one or more policy rules via Border Gateway Protocol (BGP). Such a BGP message may include an action for a particular traffic flow, such as allowing or denying the flow and a list of one or more destination protocols and ports for application of the specified action. In such an example, the BGP message may further specify one or more tags (as a tag identifier—ID) for an object as an extended community for BGP. Additional information with respect to BGP is described in "BGP MPLS-Based Ethernet VPN," RFC 7432, Internet Engineering Task Force (IETF), February 2015, available at https://tools.ietf.org/html/rfc7432, the entire contents of which is incorporated herein by reference.

As further shown in the example of FIG. 2, policy controller 23 may distribute policy rules in the form of access control lists (ACLS) 50. Policy controller 23 may convert the above described policies into ACLs 50, and then deploy ACLS 50 (which may represent one or more policy rules) to TOR switch 16Z. TOR switch 16Z may then apply ACLS 50 to network traffic destined for and received from BMS 28. BMS 28 may, given the restrictive execution environment, only execute WLs 37 (and in some instances, not even WLs 37) but not, as shown in the example of FIG. 2, a virtual router 30 or VN agent 35. More information regarding how various aspects of the scalable policy management techniques are performed by policy controller 23 to configure the ACLS 50 within TOR switch 16Z are described below with respect to the example of FIG. 3.

Figure 3:
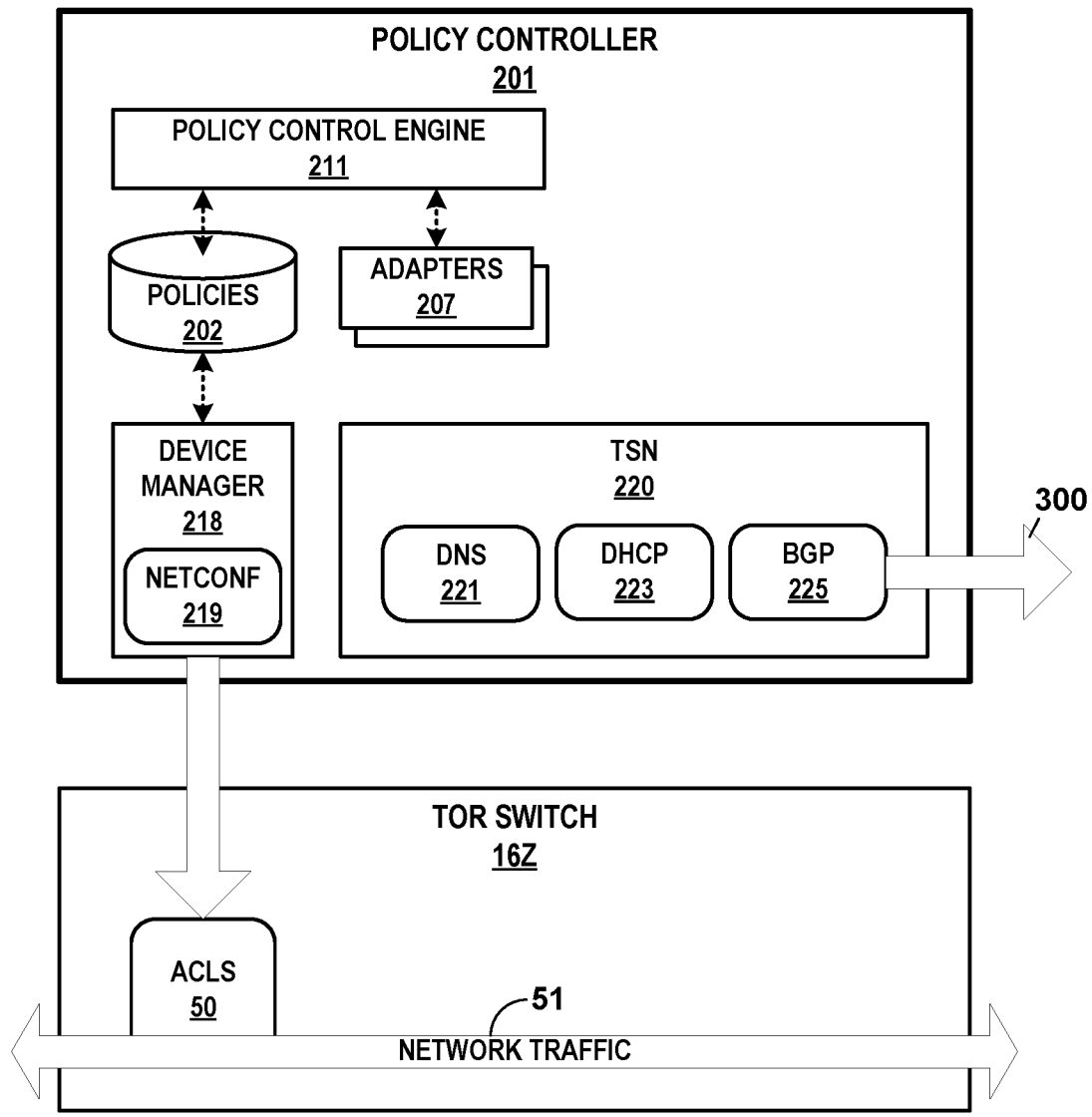
FIG. 3 is a block diagram illustrating the policy controller and the supporting TOR switch of FIG. 2 in more detail.

FIG. 3 is a block diagram illustrating the policy controller and the supporting TOR switch of FIG. 2 in more detail. Policy controller 201 shown in FIG. 3 may represent one example of policy controller 23 shown in the examples of FIG. 2.

As shown in the example of FIG. 3, policy controller 201 may represent a collection of tools, systems, devices, engines, and modules that perform operations in accordance with one or more aspects of the present disclosure. Policy controller 201 of FIG. 3 may be implemented in a manner consistent with the description of policy controller 23 provided in connection with FIG. 1.

In FIG. 3, policy controller 201 includes policies 202, as illustrated in FIG. 1. Policies 202 may also be implemented in a manner consistent with the description of policies provided in connection with FIG. 1. In some examples, as illustrated in FIG. 2, policies 202 may be implemented as a data store. In such an example, policies 202 may represent any suitable data structure or storage medium for storing policies 202 and/or information relating to policies 202. Policies 202 may be primarily maintained by policy control engine 211, and policies 202 may, in some examples, be implemented through a NoSQL database. Policy control engine 211 may also control adapters 207.

In one example, policy control engine 211 invokes one or more adapters 207 to discover platform-specific resources and interact with platform-specific resources and/or other cloud computing platforms. For instance, one or more adapters 207 may include an OpenStack adapter configured to communicate with an OpenStack cloud operating system operating on servers 126. One or more adapters 207 may include a Kubernetes adapter configured to communicate with a Kubernetes platform on servers 126. Adapters 207 may further include an Amazon Web Services adapter, Microsoft Azure adapter, and/or a Google Compute Engine adapter. Such adapters may enable policy controller 201 to learn and map the infrastructure utilized by servers 12 and BMS 28. Policy controller 201 may use multiple adapters 207 at the same time.

Policy control engine 211 may, as one example, instantiate one or more objects representative of the infrastructure, such as chassis switches 18, TOR switches 16, servers 12, and BMS 28. Policy control engine 211 may, as noted above, instantiate one or more object for supporting TOR switch 16Z and adjacent BMS 28 within policy management database 202 (which may be another way to refer to policies 202). Policy control engine 211 may associate the policies 202 to be enforced by various portions of the infrastructure to the various objects of the policy management database.

Device manager 218 may represent a unit configured to manage network devices discovered by policy control engine 211 through inspection via adapters 207. Responsive to determining that one or more policies 202 are associated with an object representative of either TOR switch 16Z and/or adjacent BMS 28, device manager 218 may convert the policies 202 to configuration data (shown as "ACLS 50" in the example of FIG. 3) supported by TOR switch 16Z in the manner discussed in more detail above.

To illustrate, consider that some TOR switches 16 may support address groups while others TOR switches 16 may not. Further, an interface of BMS 28 may be associated with one or more tags, or may inherit tags from a project/virtual node (VN) to BMS represented VMI interface. Device manager 218 may select an application tag from the one or more tags (which may be a list) associated with the interface of BMS 28, a corresponding application policy set (APS) at a global and possibly project configuration level, and potentially a global default APS level. Device manager 218 may select, in the following order, the global default APS first, followed by the global application tag APS, followed by with the project default APS associated with the BMS interface, and then the project application tag APS associated with the BMS interface.

As an example, consider an example Action (Pass) policy rule with a Service-group (e.g., a list of port and protocol) for an Endpoint 1 (routing engine expression of tags) in a direction (receiving → or sending ←, or both ← →) to Endpoint 2 (identified using a regular expression of tags) having a Match condition. TOR switch 16Z may include a Service-group construct or not. When TOR switch 16Z includes the Service-group construct, device manager 218 may translate the Service-group of the above policy as it is. When TOR switch 16Z does not include the Service-group construct, device manager 218 may translate the convert the above policy to a flat list and repeat all of the other tuples as same.

Device manager 218 may next identify when the regular expression for Endpoint 1 and Endpoint 2 supports "=" and "&." For example, assume Endpoint 1 is "Tier=Web & Site=USA & Deployment=Production." Device manager 218 may create an address group called "Tier_Web_Site_USA_Deployment_Production" and add all of the ports which have the above tags to this address group. Device manager 218 may perform the same operations with respect to the regular expression for Endpoint 2. When the address_group expression is not present, device manager 218 may use each IP prefix and repeat other entries in the tuple.

When processing the Match condition, device manager 218 may expand and define them as part of Endpoint 1 and Endpoint 2. For example, assume that the above policy is matching on Application. Assuming device manager 218 received "Application=HRAPP" and "Application= FinanceApp tags," device manager 218 may add these conditions to Endpoint 1 and Endpoint 2 as multiple rules. Device manager 218 may define the foregoing as flat rules, which represent configuration data supported by TOR switch 16Z, and program the flat rules within TOR switch 16Z as ingress and egress rules based on the direction set forth in the above policy.

Device manager 218 may then interface with TOR switch 16Z to configure, based on ACLS 50, the policy within TOR switch 16Z using NETCONF 219. More information regarding NETCONF can be found in RFC 6241, entitled "Network Configuration Protocol (NETCONF)," dated June 2011, the entire contents of which are hereby incorporated as if set forth in its entirety. Although described as interfacing with TOR switch 16Z using NETCONF 219, device manager 218 may utilize any device management protocol by which to interface with TOR switch 16Z, such as Junos PyEz. In any event, device manager 218 may install the ACLS 50 within TOR switch 16Z to thereby allow TOR switch 16Z to enforce the policy represented by ACLS 50. Device manager 218 may associate the ACLS 50 with one or more ports to which BMS 28 interfaces with TOR switch 16Z.

In other words, device manager 218 may identify a port of TOR switch 16Z to which BMS 28 is coupled. Device manager 218 may obtain the port of TOR switch 16Z through inspection of policies 202, where the object representative of TOR switch 16Z may identify the port to which BMS 28 couples to TOR switch 16Z. Device manager 218 may, when obtaining policy 202, also determine to which port BMS 28 couples to TOR switch 16Z. Device manager 28 may obtain the various tags associated with WLs 37, and identify which of the WLs 37 executed by BMS 28 are associated with policy 202. Policy 202 may include tag identifiers, which device manager 28 may obtain so as to identify the associations between tagged WLs 37 and policies 202. In this way, device manager 28 may identify WLs 37 executed by BMS 28 to which policies 202 are associated. Device manager 28 may then convert policy 202 into configuration data supported by TOR switch 16Z to enforce at least a portion of policy 202 with respect to network traffic 51 passing between the TOR switch 16Z and the associated WLs 37 executed by BMS 28 via the identified port.

Device manager 218 may also interface with TOR switch 16Z to update ACLS 50. That is, responsive to determining that one or more policies 202 associated with the object representative of TOR switch 16Z and/or BMS 28 has changed, device manager 218 may convert the updated one or more of policies 202 into new ACLS 50, and configure, via NETCONF 219, TOR switch 16Z to apply new ACLS 50 to network traffic 51 passing between TOR switch 16Z and BMS 28 via the identified port.

TOR switch 16Z may then apply ACLS 50 to network traffic 51 destined for and/or received from BMS 28. Application of ACLS 50 may result in TOR switch 16Z dropping and/or forwarding one or more flows represented by network traffic 51. Although not shown in the example of FIG. 3, device manager 18 may obtain information indicative of which flows are dropped and/or forwarded, and generate one or more alerts, errors, warning and/or reports indicative of the dropped and/or forwarded flows, which may be used in troubleshooting execution of different workloads on BMS 28, BMS 28 itself, etc.

As further shown in the example of FIG. 3, policy controller 201 also includes TSN 220. TSN 220 may represent a unit configured to interface with TOR switches 16 in order to provide backend services, such as domain name system (DNS) services 221 ("DNS 221"), and dynamic host configuration protocol (DHCP) services ("DHCP 223"). More information regarding DNS can be found in RFC 1034, entitled "Domain Names—Concepts and Facilities," dated November 1987, and RFC 1035, entitled "Domain Names—Implementation and Specification," dated November 1987, the entire contents of both of which are hereby incorporated by reference as if set forth in their respective entireties. More information regarding DHCP can be found in RFC 2131, entitled "Dynamic Host Configuration Protocol," dated March 1997, the entire contents of which are hereby incorporated by reference as if set forth in its entirety. TSN 220 may also include a BGP service 225 ("BGP 225") that obtains routing advertisements 300 in the manner described above.

TSN 220 may determine when to send the routing advertisements 300 advertising the EVPN route, as one example, responsive to receiving a request for a network address via DHCP 223. That is, BMS 28 may, as a way of gaining access to the network, issue a DHCP discover message requesting that TSN 220 and any other DHCP server that receives the DHCP discover message provide an offer for an IP address. TSN 220 may responsive to this DHCP discover message provide a DHCP offer message identifying an IP address for use by BMS 28, and various parameters associated with use of the IP address (duration, type—static or dynamic, etc.). BMS 28 may then respond with a DHCP request message requesting the IP address in the DHCP offer message be reserved for use by BMS 28.

In any event, the request for the IP address signals to TSN 220 that BMS 28 is attempting to access the network (which may be performed shortly after BMS 28 is booted up or otherwise powered on). Responsive to the request for the IP address, TSN 220 may invoke BGP service 225 to obtain routing advertisement 300. As noted above and described below in more detail with respect to FIG. 4, routing advertisement 300 may include the tags, expressed as one or more BGP extended communities. The route may include an EVPN route to BMS 28, and routing advertisement 300 may include, in addition to the tag, a next hop field identifying TOR switch 16Z as the next hop. Routing advertisement 300 may also include one or more of a label associated with a VLAN, a label associated with a VXLAN, and a security group to which the route corresponds. TSN 220 may, after obtaining routing advertisement 300 via BGP server 225, output or otherwise transmit (such as broadcast) routing advertisement 300 to the network.

TSN 220 may transmit the routing advertisement so as to enable BMS 28 to communicate with any other overlay workloads supported by virtual routers 30 of servers 12. Each of virtual routers 30 may process routing advertisement 300 to extract the tags. Virtual routers 30 may process the tags during policy evaluation. Each of the policies may include a tag identifier (ID). Virtual routers 30 may process the tags and identify, based on the tag IDs, which policy is to be enforced with respect to traffic received or sent via the associated route. More information regarding policy evaluation is described in U.S. application Ser. No. 15/476,136, entitled "SESSION-BASED TRAFFIC STATISTICS LOGGING FOR VIRTUAL ROUTERS," field Mar. 31, 2017, the entire contents of which are hereby incorporated by reference as if set forth in its entirety; and above noted U.S. patent application Ser. No. 15/819,522, entitled "SCALABLE POLICY MANAGEMENT FOR VIRTUAL NETWORKS," filed Nov. 21, 2017. VN agents 35 may then enforce the various policies associated with the tags to prohibit or authorize transmission of traffic via the route to associated BMS 28.

TOR switch 16Z may receive routing advertisement 300 and attempt to process routing advertisement 300. However, because the next hop in routing advertisement 300 identifies TOR switch 16Z, TOR switch 16Z may drop routing advertisement 300 before updating routing information stored by TOR switch 16Z, thereby preventing any circular forwarding of network traffic.

Figure 4:
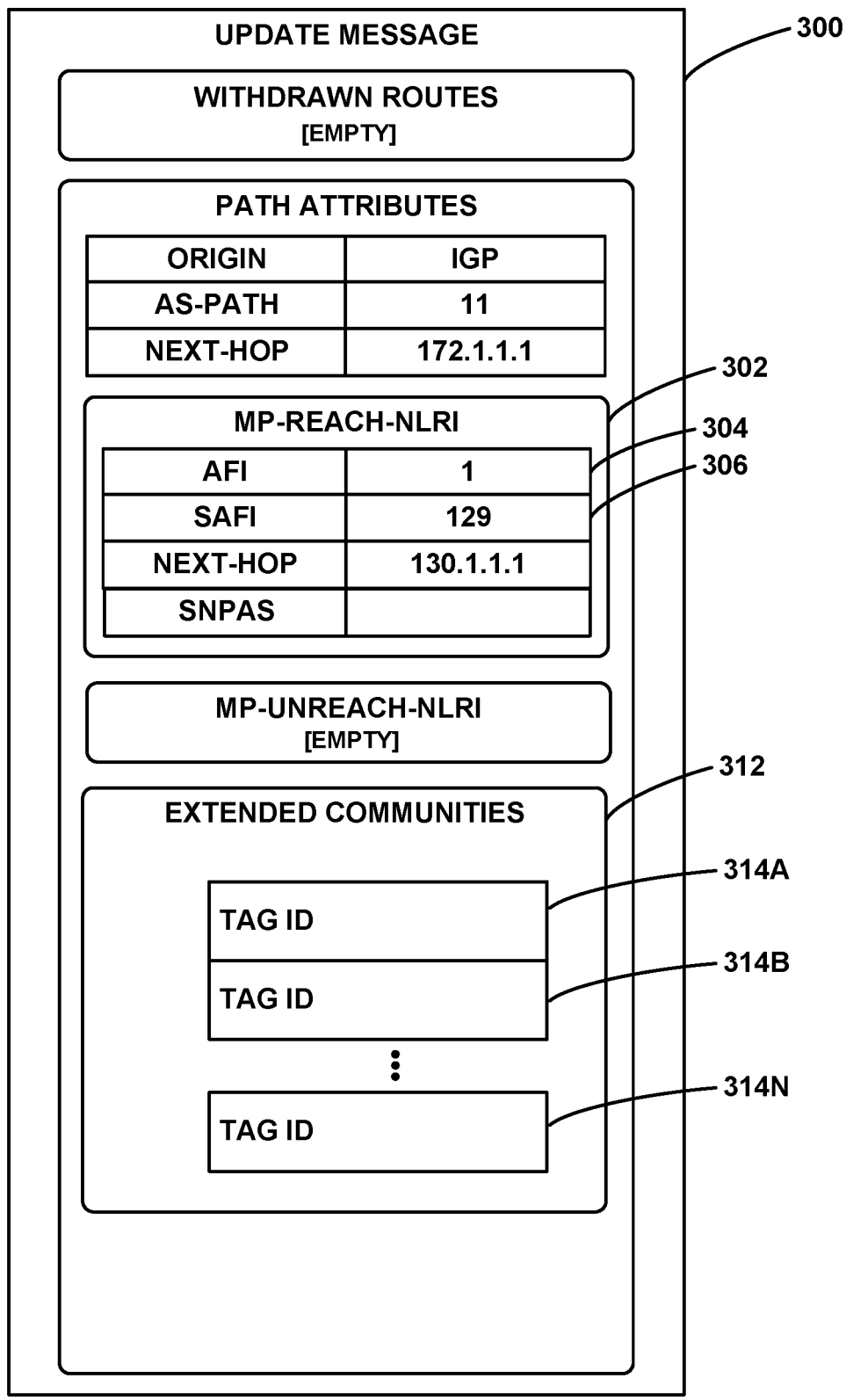
FIG. 4 is a block diagram illustrating an example routing advertisement that includes tag information in accordance with techniques described herein.

FIG. 4 is a block diagram illustrating an example routing advertisement that includes tag information in accordance with techniques described herein. Routing advertisement 300, shown as Extended BGP UPDATE message 300, conforms to MP-BGP and includes MP-REACH-NLRI 302 advertising a route. For purposes of illustration, extended BGP UPDATE message 300 is illustrated using glyphs, rather than with packet fields.

Extended communities attribute 312 includes field 313 that defines one or more policy rules for application to one or more objects specified by fields 314A-314N (collectively, "tag IDs 314"). Tag IDs 314 may be generated during the tag creation.

That is, administrator 24 may provide key/value pairs. In some examples, each key of a key/value pair specifies one of an application, a deployment, an application tier, a geographic site, a virtual network, a virtual machine, an interface, a project, a security requirement, a quality requirement, a user, or a compliance requirement, while the corresponding value specifies a descriptor value for the key. For example, a key associated with a tag may describe a particular category, for example, an "application" tier. Further, a value associated with the tag may express one or more definitions for the category described by the key, for example, a "development" application tier. In other examples, a key may specify a user, a user role, an operating system, a compute node, a rack, a point of distribution, a network cluster, or a data center. The policy controller 201 may then reduce the key/value pairs to respective tag IDs 314, which may then be advertised via routing advertisement 300.

The policy controller 201 may also distribute, outside of BGP (via NETCONF or some other device management protocol), policy rules that describes one or more rulesets for application to traffic among objects described by tags IDs 314. Each ruleset may describe whether to allow or block traffic between the objects described by tags IDs 314. Each ruleset may further describe one or more objects or groups of objects to which each policy rule is applied.

An example schema for a policy rule is provided below:
[Order] [Status] [Action] [Service] [End Point 1] [Direction] [End Point 2] [Match Tags Expression] [Action]

The [Order] field describe the order of application of the policy rule.

The [Status] field indicates to VN agent 35 whether to enable or disable the policy rule. In some examples, the [Status] field is enabled or disabled by an administrator via a user interface of VN agent 35, such as a command-line interface (CLI).

The [Action] field indicates whether to allow or deny traffic that matches objects described by the tags of the policy rule.

The [Service] field may specify a destination protocol, a destination port, or a service group (e.g., a list of ports and protocols) of network traffic to which VN agent 35 should apply the policy rule.

The [End Point 1] and [End Point 2] fields describe objects that share network traffic to which VN agent 35 should apply the policy rule. In some examples, these fields are complex regular expressions that describes multiple objects to which to apply the policy rule. These fields may include information such as a network address prefix, a network address group, a virtual network, one or more expression tags, or a domain name of one or more objects for application of the policy rule.

The [Direction] field may indicate a direction of session initiation for application of the policy rule. Example values for the [Direction] field include ">" (e.g., "left-to-right," sessions where End Point 1 initiates the session with End Point 2), "<" (e.g., "right-to-left," sessions where End Point 2 initiates the session with End Point 1), or "< >" (e.g., "either," sessions where either End Point 1 initiates the session with End Point 2 or End Point 2 initiates the session with End Point 1).

The [Match Tags Expression] field may indicate to VN agent 35 to apply the policy rule to traffic that matches an origin as described with respect to the [End Point 1] field and a destination as described with respect to the [End Point 2] field. In some examples, this action by default matches network traffic within a particular project. In other examples, if a user specifies a match, the default is overridden.

The [Simple Action] field specifies an action to take on network traffic that matches the tags and policy rule. For example, upon determining that network traffic between two or more objects matches the tags specified by the policy rule, the policy rule may specify that that VN agent 35 should log the network traffic, reject the network traffic, permit the network traffic, or issue an alert to an administrator.

In accordance with the foregoing example schema for policy rule 313, example policy rules are described below:

Example 1: allow tcp 80 tier=web>tier=app match deployment && site

In example 1, the policy rule specifies that network traffic that uses TCP protocol on port 80, originates from virtual machine interfaces within a Web tier and is destined for virtual machine interfaces within an Application tier, and that matches both deployment and site tags, should be allowed.

Example 2: allow tcp 3036 tier=app>tier=db match deployment && site

In example 2, the policy rule specifies that network traffic that uses TCP protocol on port 3036, originates from virtual machine interfaces within an Application tier and is destined for virtual machine interfaces within a Database tier, and that matches both deployment and site tags, should be allowed.

Example 3: allow any any any>address-group=legacy-svc

In example 3, the policy rule specifies that network traffic that uses any protocol on any port, with any origin and is destined for virtual machine interfaces within a legacy SVC address group, should be allowed.

Example 4: deny web-service any address-group=blacklist < > any action=log

In example 4, the policy rule specifies that network traffic that uses a web service protocol, originates from addresses within a blacklisted Address Group, and is destined for any virtual machine interface, should be denied. Further, the policy rule specifies that the network traffic should be logged.

In this way, policy controller 23 may distribute new policies to VN agents 35 of a plurality of data centers 10 outside of BGP, and then associate routes to policies via tag IDs 314 distributed via one or more BGP UPDATE messages 300. Further, VN agents 35 may apply the received policies at the interface level so as to express the policies identified by tags IDs 314. In this fashion, an administrator may distribute simplified traffic policies that are scalable and robust across many different types of deployments and execution environments.

Device manager 218 may reduce the foregoing policy rule to one or more entries in ACLs 50 in the manner described above. Device manager 218 may then configure the ACLS 50 within TOR switch 16Z, associating the ACLS 50 to a port of TOR switch 16Z that couples TOR switch 16Z to BMS 28.

Figure 5:
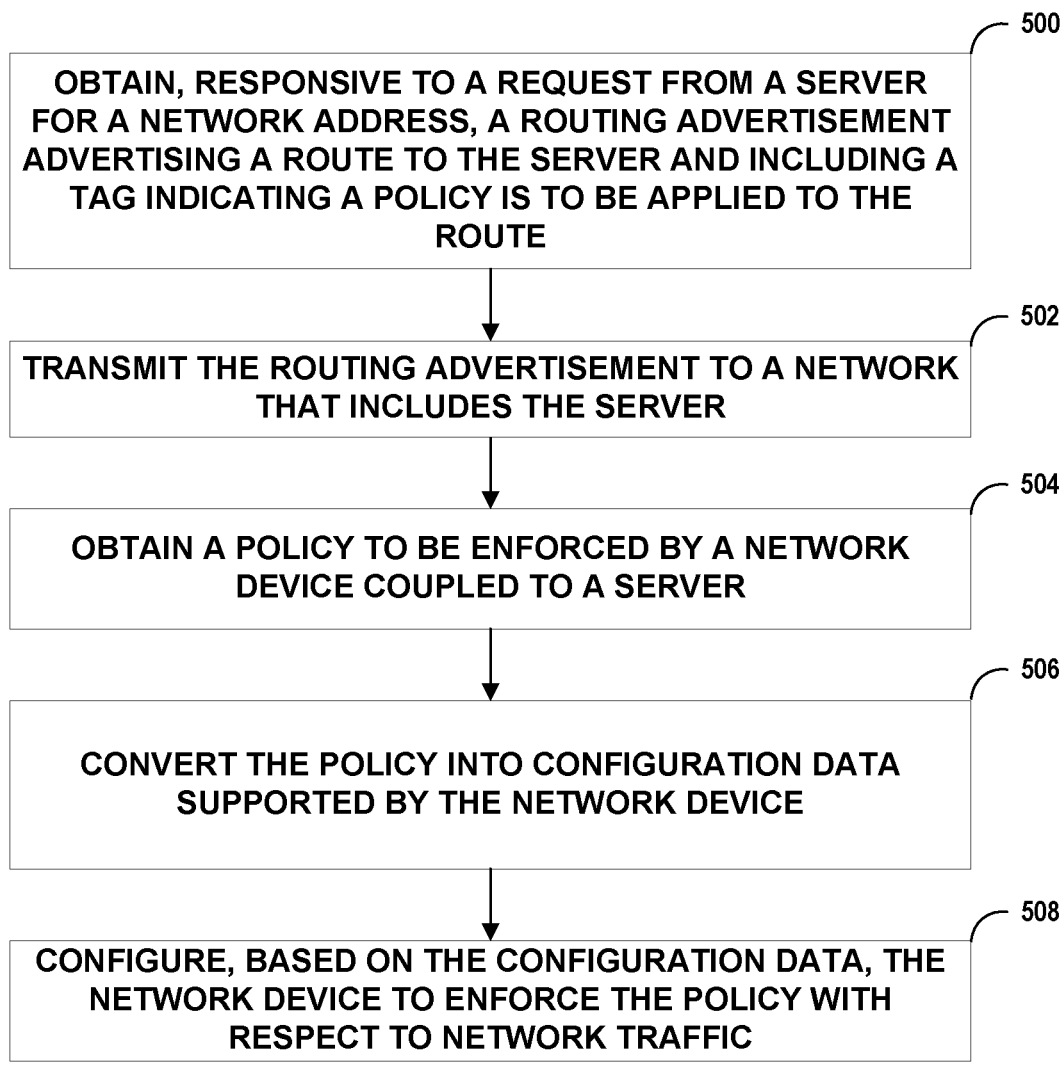
FIG. 5 is a flowchart illustrating an example operation of the policy controller shown in the example of FIG. 3 in accordance with various aspects of the techniques described in the disclosure.

FIG. 5 is a flowchart illustrating an example operation of the policy controller shown in the example of FIG. 3 in accordance with various aspects of the techniques described in the disclosure. As shown in the example of FIG. 5, TSN 220 of policy controller 201 may obtain, responsive to a request from a server, i.e., BMS 28 in the examples described above, for a network address (such as an IP address) via DHCP 223, a routing advertisement 300 advertising a route to BMS 28 and including a tag indicating a policy is to be applied to the route (500). TSN 220 may transmit routing advertisement 300 to a network that includes BMS 28 (502) as described above (502).

Device manager 218 of policy controller 201 may next obtain a policy to be enforced by a network device coupled to BMS 28, which is described in the examples above as being TOR switch 16Z (504). Device manager 218 may next convert the policy into configuration data 50 supported by TOR switch 16Z (506). Device manager 218 may configure, via NETCONF 219 and based on configuration data 50, the network device to enforce the policy with respect to network traffic 51 (508).

In other words, the scalable policy deployment techniques may provide a rich set of security application policies, with virtual router presence at any node. However, there are cases, such as in the context of bare metal servers, that may not allow deployment of virtual routers for various reasons. Additionally, data center operators may not want bare metal servers executing any new software. Also, performance may be better when TOR switches implement security policies. Additionally, there are many network devices that support basic firewall functions, but do not support a rich set of application-based firewall policy constructs.

To overcome these deficiencies, virtual network controller 22 may initiate a device manager connection to TOR switch 16Z. Virtual network controller 22 may convert firewall or other types of policies to TOR switch configuration or server IP table configuration or combination of both to confirm to the policies. The same techniques may be extended to support any other network device by a device manager (e.g., executing at virtual network controller 22) connecting via various application programmer interfaces (APIs) exposed by the network device. As noted above, virtual network controller 22 may add tags to workloads and then attach tags to server and/or interfaces of TOR switch 16Z. Virtual network controller 22 may add policies per application via application policy sets.

Virtual network controller 22 may compute TOR switch and/or IP table rules based on application policy set policies and send configuration data via the device manager to TOR switch 16Z. Configuration at TOR switch 16Z may use IP tables/BGP to convert application policy set constructs. While described with respect to TOR switch and/or IP table rules, various other types of configuration data may also be used in conjunction with or as alternative to the foregoing TOR switch and/or IP tables. For example, the techniques may be implemented using IP tables of BMS 28, netfilter, or enhanced Berkeley Packet Filters (eBPF), or any other type of filtering mechanism.

Figure 6:
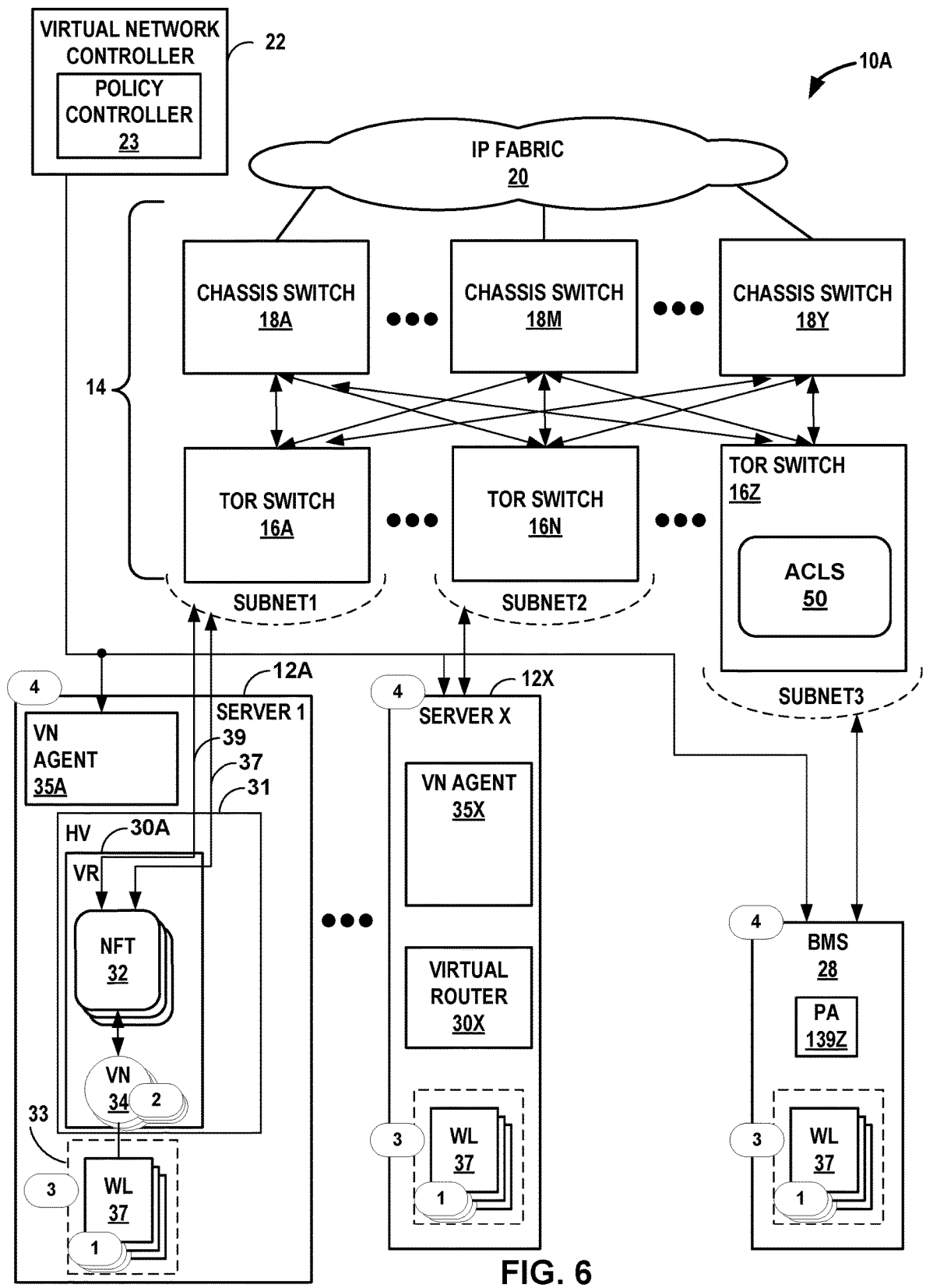
FIG. 6 is a block diagram illustrating another example implementation of the data center of FIG. 1 in further detail.

FIG. 6 is a block diagram illustrating another example implementation of data center 10A of FIG. 1 in further detail. The example shown in FIG. 6 is similar to that shown in the example of FIG. 2, except that BMS 28 may allow execution of a PA agent 139Z, which may enforce the various aspects of policies in the form of one or more IP tables that indicate to which IP addresses network traffic may be sent, and/or to which IP addresses network traffic may not be sent. TOR switch 16Z may implement other aspects of the policies via ACLS 50 in the manner described above, thereby facilitating load balancing between TOR switch 16Z and BMS 28.

BMS 29 may still, however, prohibit execution of a VN agent and/or a virtual router. As a result of these restrictions, policy controller 23 may continue, in this instance, to advertise the route in the manner described above.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
obtaining, by a policy controller, a policy to be enforced by a supporting network device of a switch fabric coupled to a server;
identifying, by the policy controller, a port of the supporting network device to which the server is coupled via the switch fabric;
identifying, by the policy controller, a workload executed by the server to which the policy is associated;
converting, by the policy controller, the policy into configuration data supported by the supporting network device, the configuration data indicating that a portion of the policy is to be enforced at the identified port; and
configuring, by the policy controller and based on the configuration data supported by the supporting network device, the supporting network device to enforce the portion of the policy with respect to network traffic passing between the supporting network device and the workload executed by the server via the identified port.

2. The method of claim 1, further comprising representing, by the policy controller, the supporting network device as a first object in a policy management database and the server as a second object in the policy management database,
wherein obtaining the policy comprises obtaining, from the policy management database, the policy associated with the first object.

3. The method of claim 1, further comprising:
obtaining, by the policy controller, a routing advertisement that identifies a route associated with the workload, and includes a tag indicating that the policy is to be applied with respect to the route;
transmitting, by the policy controller and to a network that includes the server, the routing advertisement.

4. The method of claim 3,
wherein the routing advertisement includes a routing advertisement that conforms to a border gateway protocol (BGP), and
wherein the tag is specified in the routing advertisement as a BGP extended community.

5. The method of claim 3, wherein the routing advertisement includes, in addition to the tag, a next hop as the supporting network device.

6. The method of claim 5,
wherein the route comprises a Ethernet virtual private network (EVPN) route, and
wherein the routing advertisement also includes one or more of a label associated with a virtual local area network (VLAN), a label associated with virtual extensible local area network (VXLAN), and a security group to which the route corresponds.

7. The method of claim 3, wherein obtaining the routing advertisement comprises obtaining, responsive to receiving a request for a network address, the routing advertisement.

8. The method of claim 3, wherein the server comprises a bare metal server.

9. The method of claim 1,
wherein the policy includes one or more policy rules,
wherein each policy rule of the one or more policy rules specifies one or more tags, and
wherein the one or more tags specify one or more dimensions of a plurality of dimensions.

10. The method of claim 1, wherein the supporting network device is directly coupled to the server and forwards network traffic destined for the workload executed by the server directly to the server and network traffic received directly from the workload executed by the server to a network.

11. The method of claim 1,
wherein the server comprises a protected server reserved for executing a limited set of workloads outside of customer processes, and
wherein the supporting network device comprises a switch.

12. The method of claim 1, wherein the configuration data includes an access control list identifying flows within the network traffic that are to be dropped.

13. The method of claim 1, further comprising:
converting, by the policy controller, the policy into configuration data supported by the server; and
configuring, based on the configuration data supported by the server, the server to enforce another portion of the policy with respect to one or more of the network traffic directed to the server and the network traffic sent from the server.

14. A network device comprising:
a memory configured to store a policy; and
one or more processors configured to execute a policy controller to:
obtain the policy to be enforced by a supporting network device of a switch fabric coupled to a server;
identify a port of the supporting network device to which the server is coupled via the switch fabric;
identify a workload executed by the server to which the policy is associated;
convert the policy into configuration data supported by the supporting network device, the configuration data indicating that a portion of the policy is to be enforced at the identified port; and
configure, based on the configuration data, the supporting network device to enforce the portion of the policy with respect to network traffic passing between the supporting network device and the workload executed by the server via the identified port.

15. The network device of claim 14,
wherein the one or more processors are further configured to represent the supporting network device as a first object in a policy management database and the server as a second object in the policy management database, and
wherein the one or more processors are configured to obtain, from the policy management database, the policy associated with the first object.

16. The network device of claim 14, wherein the one or more processors are further configured to:
obtain a routing advertisement that identifies a route associated with the workload, and includes a tag indicating that the policy is to be applied with respect to the route;
transmit, to a network that includes the server, the routing advertisement.

17. The network device of claim 16,
wherein the routing advertisement includes a routing advertisement that conforms to a border gateway protocol (BGP), and
wherein the tag is specified in the routing advertisement as a BGP extended community.

18. The network device of claim 16, wherein the routing advertisement includes, in addition to the tag, a next hop as the supporting network device.

19. The network device of claim 18,
wherein the route comprises a Ethernet virtual private network (EVPN) route, and wherein the routing advertisement also includes one or more of a label associated with a virtual local area network (VLAN), a label associated with virtual extensible local area network (VXLAN), and a security group to which the route corresponds.

20. The network device of claim 16, wherein the one or more processors are configured to obtain, responsive to receiving a request for a network address, the routing advertisement.

21. The network device of claim 16, wherein the server comprises a bare metal server.

22. The network device of claim 14,
wherein the policy includes one or more policy rules,
wherein each policy rule of the one or more policy rules specifies one or more tags, and
wherein the one or more tags specify one or more dimensions of a plurality of dimensions.

23. The network device of claim 14, wherein the supporting network device is directly coupled to the server and forwards network traffic destined for the workload executed by the server directly to the server and network traffic received directly from the workload executed by the server to a network.

24. The network device of claim 14,
wherein the server comprises a protected server reserved for executing a limited set of workloads outside of customer processes, and
wherein the supporting network device comprises a switch.

25. The network device of claim 14, wherein the configuration data includes an access control list identifying flows within the network traffic that are to be dropped.

26. The network device of claim 14, wherein the one or more processors are further configured to:
convert the policy into configuration data supported by the server; and
configure, based on the configuration data supported by the server, the server to enforce another portion of the policy with respect to one or more of the network traffic directed to the server and the network traffic sent from the server.

27. A non-transitory computer-readable storage medium having stored thereon instructions that, when executed, cause one or more processors of a policy controller to:
obtain a policy to be enforced by a supporting network device of a switch fabric coupled to a server;
identify a port of the supporting network device to which the server is coupled via the switch fabric;
identify a workload executed by the server to which the policy is associated;
convert the policy into configuration data supported by the supporting network device, the configuration data indicating that a portion of the policy is to be enforced at the identified port; and
configure, based on the configuration data, the supporting network device to enforce the portion of the policy with respect to network traffic passing between the supporting network device and the workload executed by the server via the identified port.

28. A data center comprising:
a server directly coupled to a network device;
a controlling device comprising:
a memory configured to store a policy; and
one or more processors configured to execute a policy controller that:
obtains, by a policy controller and from the memory, the policy to be enforced by the network device;
converts, by the policy controller, the policy into configuration data supported by the network device; and configures, by the policy controller and based on the configuration data, the network device to enforce the policy; and the network device comprising:

a memory configured to store the configuration data; and one or more processors configured to:

receive one or more of network traffic directed to the server and network traffic received from the server; and enforce at least some aspect of the policy with respect to one or more of network traffic directed to the server and network traffic sent from the server.

\* \* \* \* \*